US012780539B2

(12) United States Patent
Kinugawa et al.

(10) Patent No.: US 12,780,539 B2
(45) Date of Patent: Nov. 3, 2026

(54) TRANSPORT VEHICLE

(71) Applicants: Daifuku Co., Ltd., Osaka (JP); Taiwan Daifuku Co., Ltd., Tainan-city (TW)

(72) Inventors: Tomotaka Kinugawa, Hinocho (JP); Jia-Yang Shen, Tainan-city (TW)

(73) Assignees: Daifuku Co., Ltd., Osaka (JP); Taiwan Daifuku Co., Ltd., Tainan-city (TW)

( * ) Notice: Subject to any disclaimer, the term of this patent is extended or adjusted under 35 U.S.C. 154(b) by 530 days.

(21) Appl. No.: 18/239,458

(22) Filed: Aug. 29, 2023

(65) Prior Publication Data

US 2024/0067448 A1 Feb. 29, 2024

(30) Foreign Application Priority Data

Aug. 30, 2022 (JP) ................................ 2022-136876

(51) Int. Cl.
*B65G 1/04* (2006.01)

(52) U.S. Cl.
CPC ........ *B65G 1/0457* (2013.01); *B65G 2201/02* (2013.01)

(58) Field of Classification Search
CPC B65G 1/0457; B65G 1/0435; B65G 2201/02; B65G 35/00; B65G 47/905; B65G 47/907; B65G 2201/0214; B65G 2203/042; B65G 2201/0297; H10P 72/3221; H10P 72/3216; H10P 72/1918; H10P 72/7602; H10P 72/0606; H10P 72/3214; H10P 72/3202; H10P 72/7612; H10P 72/3218
See application file for complete search history.

(56) References Cited

U.S. PATENT DOCUMENTS 10,347,518 B2 * 7/2019 Murakami ........... B65G 1/0464
11,052,926 B2 * 7/2021 Imahori .................... B61B 3/00
11,069,549 B2 * 7/2021 Wada ................. H10P 72/3211
2008/0193270 A1 * 8/2008 Yoshida ................. B65G 37/02 414/731
2012/0080396 A1 * 4/2012 Uchino .............. H10P 72/3221 212/71
2012/0118845 A1 * 5/2012 Wada ........................ B61B 3/02 212/71
2013/0202392 A1 * 8/2013 Morimoto ............ B65G 1/0407 414/267
2015/0287623 A1 * 10/2015 Wada ...................... B66C 1/425 212/330

(Continued)

FOREIGN PATENT DOCUMENTS

JP 2005064130 A * 3/2005

*Primary Examiner* — Saul Rodriguez
*Assistant Examiner* — Jaimin G Patel
(74) *Attorney, Agent, or Firm* — The Webb Law Firm

(57) ABSTRACT

A holder includes a holder body, a holding part supported in a manner movable in a first direction relative to the holder body, and a holding part driver that drives the holding part. The holding part includes a supported portion supported by the holder body, a base extending downward from the supported portion, and an extension extending from the base in the first direction. The extension includes, on an upper surface of the extension, a mount area on which the lower surface of the handle is placeable. The extension includes a protrusion located opposite to the base across the mount area in the first direction. The protrusion protrudes upward from the mount area.

7 Claims, 5 Drawing Sheets

(56) References Cited

U.S. PATENT DOCUMENTS

| | | | | |
|---|---|---|---|---|
| 2017/0152111 | A1* | 6/2017 | Kinugawa | B65G 35/06 |
| 2019/0241406 | A1* | 8/2019 | Kobayashi | B65G 1/04 |
| 2019/0382206 | A1* | 12/2019 | Kinugawa | B65G 19/225 |
| 2022/0112063 | A1* | 4/2022 | Abe | B66C 13/06 |
| 2022/0157630 | A1* | 5/2022 | Kobayashi | H10P 72/3214 |
| 2022/0208583 | A1* | 6/2022 | Tomida | B66C 1/28 |
| 2023/0140218 | A1* | 5/2023 | Kobayashi | H10P 72/3202 414/814 |
| 2023/0183000 | A1* | 6/2023 | Sebastian | B65G 1/0478 414/284 |
| 2023/0278833 | A1* | 9/2023 | Kinugawa | B66C 1/28 212/276 |
| 2024/0006213 | A1* | 1/2024 | Sung | B66C 11/00 |
| 2024/0063041 | A1* | 2/2024 | Kim | H10P 72/3218 |

* cited by examiner

TRANSPORT VEHICLE

CROSS-REFERENCE TO RELATED APPLICATION

This application claims priority to Japanese Patent Application No. 2022-136876 filed Aug. 30, 2022, the disclosure of which is hereby incorporated by reference in its entirety.

BACKGROUND OF THE INVENTION

Field of the Invention

The present invention relates to a transport vehicle that travels along a travel path to transport an article and includes a compartment to accommodate the article, a holder to hold the article, and a lifter to lift and lower the holder between the compartment and a transfer area below the travel path.

Description of Related Art

An example of such a transport vehicle is described in Japanese Unexamined Patent Application Publication No. 2005-064130 (Patent Literature 1). Reference signs in parentheses used below in describing the background are the reference signs in Patent Literature 1.

The transport vehicle (1) described in Patent Literature 1 holds a flange (53) in a container (51) with a holder assembly (32) to transfer the container (51). The holder assembly (32) includes a pair of tabs (33) that are open or closed by moving in directions opposite to each other. The pair of tabs (33) are closed to hold the flange (53) between them and support the flange (53) from below.

In the structure described in Patent Literature 1, the pair of tabs (33) supporting the flange (53) from below, or specifically with the holder assembly (32) holding the container (51), may be open accidentally by, for example, a malfunction or vibration. The container (51) may then slip from the holder assembly (32).

SUMMARY OF THE INVENTION

In response to the above, techniques are awaited for appropriately reducing the likelihood that an article being held slips off.

A technique responding to the above issue provides the structure described below.

A transport vehicle for traveling along a travel path to transport an article includes a compartment that accommodates the article, a holder that holds the article, and a lifter that lifts and lowers the holder between the compartment and a transfer area below the travel path. The article includes an article body and a handle protruding upward from the article body and holdable by the holder. The handle has a lower surface facing the article body from above and a side surface continuous with the lower surface and facing toward one location in a first direction being a predetermined horizontal direction. The holder includes a holder body, a holding part supported in a manner movable in the first direction relative to the holder body, and a holding part driver that drives the holding part. The holding part includes a supported portion supported by the holder body, a base extending downward from the supported portion, and an extension extending from the base in the first direction. The extension includes, on an upper surface of the extension, a mount area on which the lower surface of the handle is placeable. The extension includes a protrusion located opposite to the base across the mount area in the first direction. The protrusion protrudes upward from the mount area.

In this structure, the lower surface of the handle in the article is placed on the mount area in the extension in the holding part, thus holding the article. With the lower surface of the handle placed on the mount area in the extension in the holding part, the handle is restricted by the protrusion from moving toward one location in the first direction and is restricted by the base in the holding part from moving toward the opposite location in the first direction. This structure can thus appropriately reduce the likelihood that the article being held slips off.

Further features and advantageous effects of the technique according to the present disclosure will be apparent from exemplary and nonlimiting embodiments described below with reference to the drawings.

DESCRIPTION OF THE INVENTION

A transport vehicle travels along a travel path to transport an article. A transport vehicle according to one or more embodiments will now be described. The transport vehicle is used in a transport facility in one or more embodiments.

Figure 3:
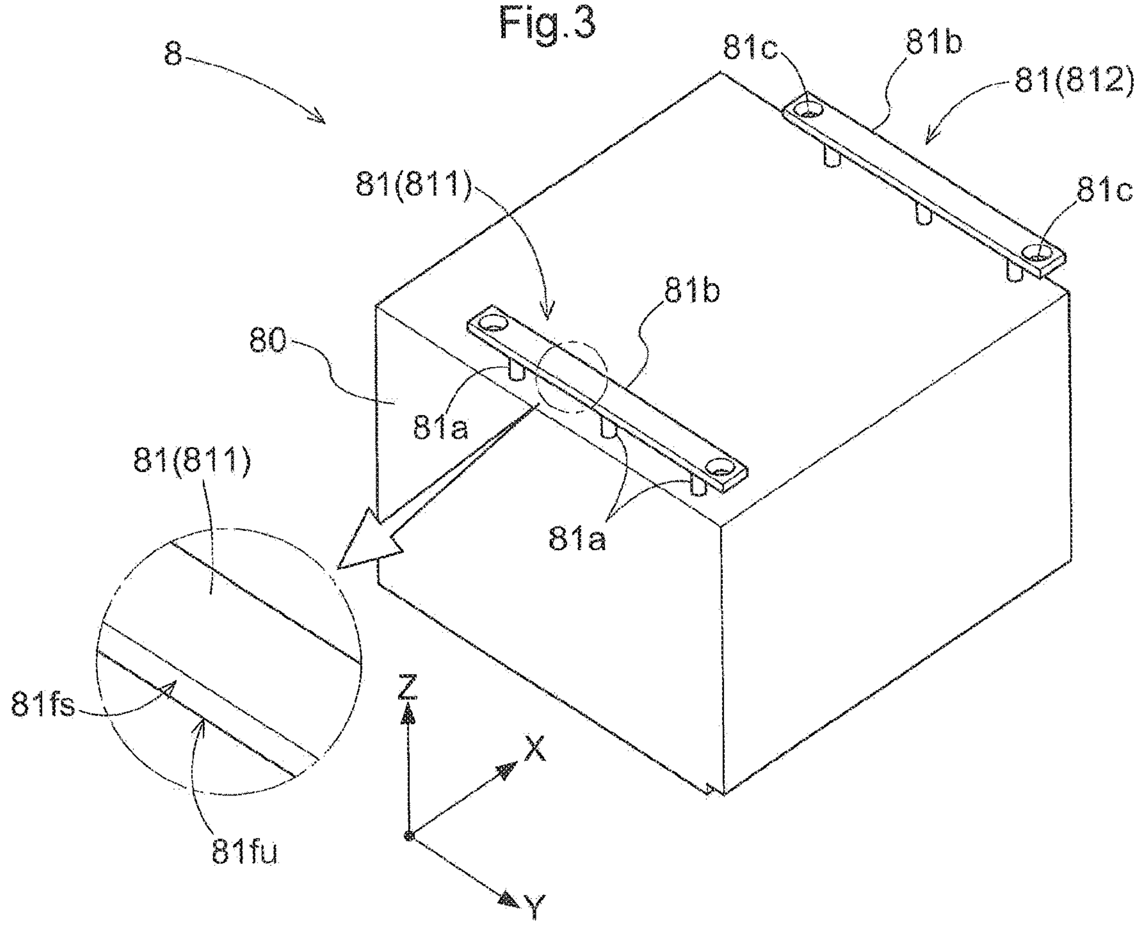
FIG. 3 is a perspective view of an article when viewed from above.

The vertical direction is hereafter denoted with Z. As shown in FIG. 3 and subsequent figures, a predetermined horizontal direction is referred to as a first direction X. The direction perpendicular to the first direction X (or the horizontal direction perpendicular to the first direction X herein) when viewed in the vertical direction Z is referred to as a second direction Y.

Figure 1:
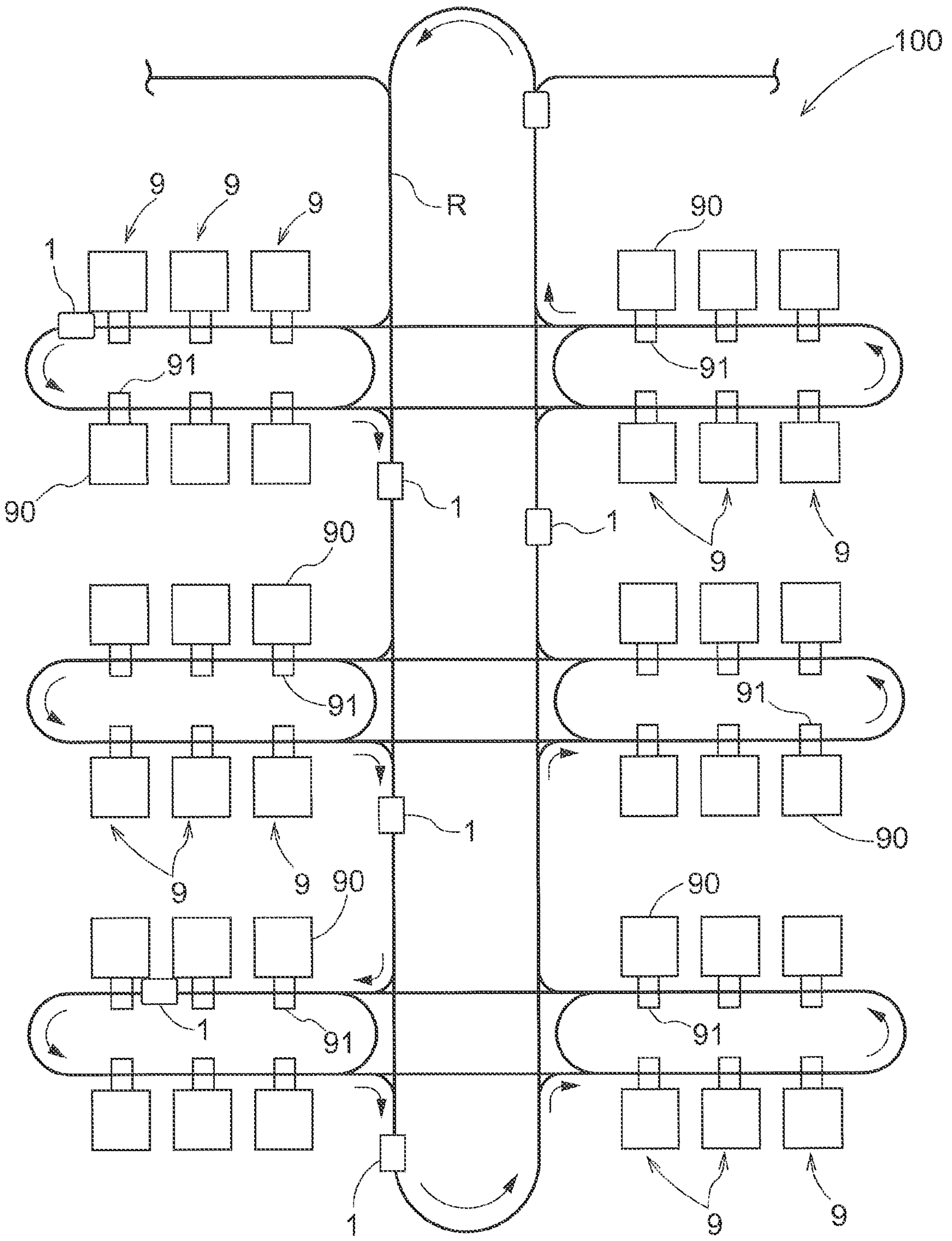
FIG. 1 is a plan view of a transport facility.
Figure 2:
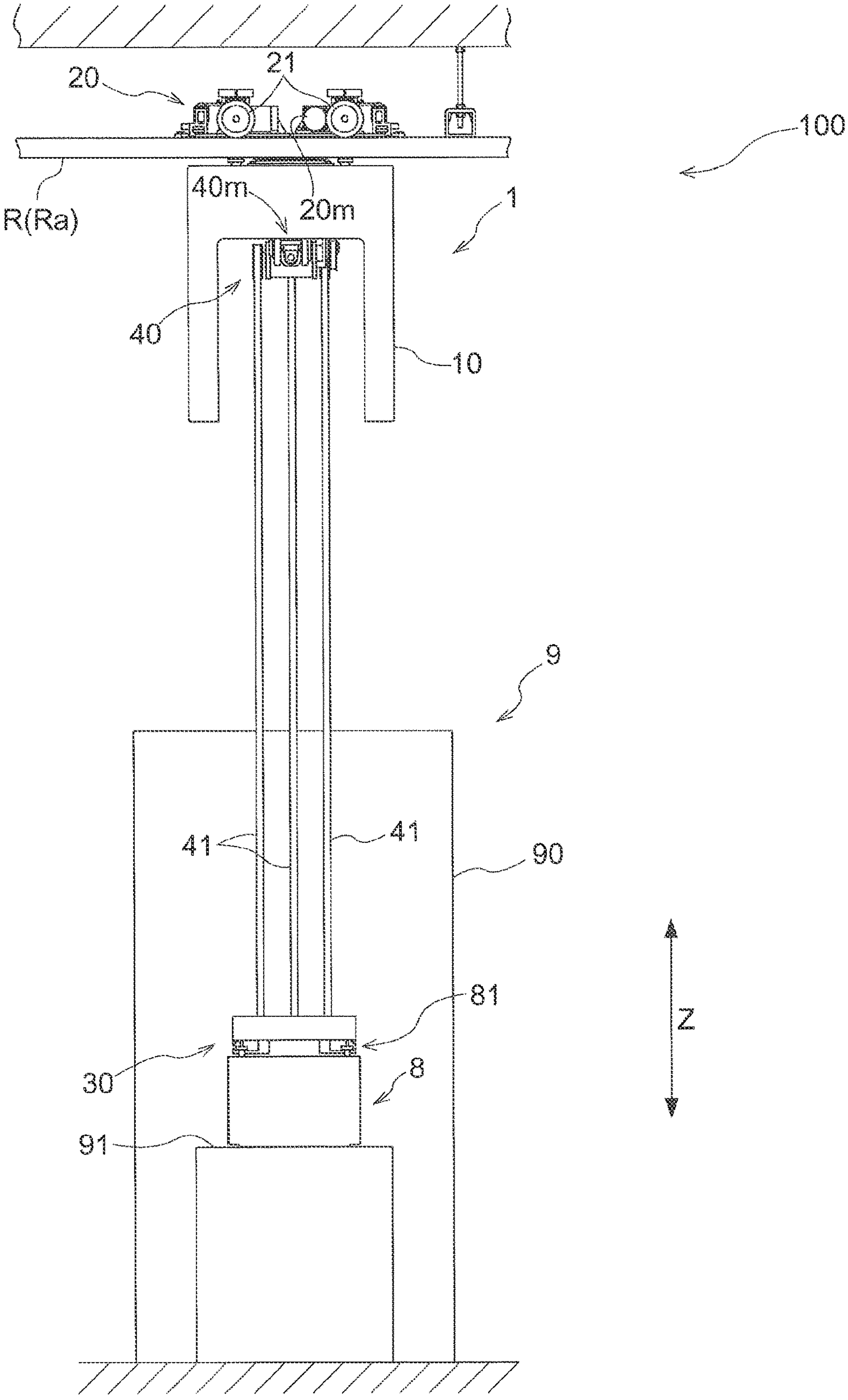
FIG. 2 is a diagram describing a transfer operation.

As shown in FIGS. 1 and 2, a transport facility 100 includes a predefined travel path R, one or more transport vehicles 1 that each travel on the travel path R to transport an article 8, and multiple transfer areas 9 defined along the travel path R.

The travel path R is spaced upward from the floor surface. In the present embodiment, the travel path R includes a rail Ra installed near the ceiling. The transport vehicle 1 is installed on the ceiling to travel along the rail Ra. The transfer areas 9 are located below the travel path R. The transport vehicle 1 lifts and lowers the article 8 and transfers the article 8 to and from the transfer areas 9.

In the present embodiment, the transport facility 100 includes multiple transport vehicles 1. Each of the multiple transport vehicles 1 performs, in response to a transport command provided from a host controller (not shown) that centrally manages the facility, a task corresponding to the transport command. For example, the transport command includes information about a transfer source and a transfer destination of an article 8. A transport vehicle 1 receives such a transport command and transports an article 8 from its transfer source to its transfer destination. The transfer source and the transfer destination include transfer areas 9.

The transport facility 100 handles various articles 8. In the present embodiment, the transport facility 100 is used in a semiconductor fabrication plant. The articles 8 are thus, for example, substrate containers (front opening unified pods, or FOUPs) accommodating substrates (e.g., wafers and panels) or reticle containers (reticle pods) accommodating reticles. In this case, the transport vehicles 1 transport, between processes, the articles 8 such as substrate containers or reticle containers along the travel path R.

In the present embodiment, each transfer area 9 includes a processor 90 that processes an article 8 and a mount 91 adjacent to the processor 90. Processing an article 8 herein refers to processing objects (substrates or reticles) accommodated in the article 8 as a container. Each transport vehicle 1 receives an article 8 that has been processed by a processor 90 from a mount 91 or delivers an article 8 that has yet to be processed by a processor 90 to a mount 91. The processors 90 perform various processes such as thin film formation, photolithography, and etching.

As shown in FIG. 2, each transport vehicle 1 includes a traveler 20 that travels on the rail Ra. Each transport vehicle 1 also includes a compartment 10 to accommodate an article 8, a holder 30 to hold the article 8, and a lifter 40 to lift and lower the holder 30 between the compartment 10 and a transfer area 9 below the travel path R.

In the present embodiment, the traveler 20 includes multiple travel wheels 21 that roll on the rail Ra and a travel wheel driver 20*m* that drives at least one or more of the travel wheels 21. For example, the travel wheel driver 20*m* is an electric motor.

In the present embodiment, the compartment 10 is hung from the traveler 20 below the rail Ra. The compartment 10 can accommodate an article 8 held by the holder 30. With the compartment 10 accommodating an article 8, the transport vehicle 1 transports the article 8 along the travel path R.

In the present embodiment, the lifter 40 includes belts 41 connected to the holder 30 and a belt driver 40*m* that drives the belts 41. The belt driver 40*m* includes a rotator around which the belts 41 are wound and a drive source that rotates the rotator. The rotor rotates in the forward direction or in the reverse direction to wind or unwind the belts 41. This causes the holder 30 connected to the belts 41 to be lifted or lowered.

Figure 4:
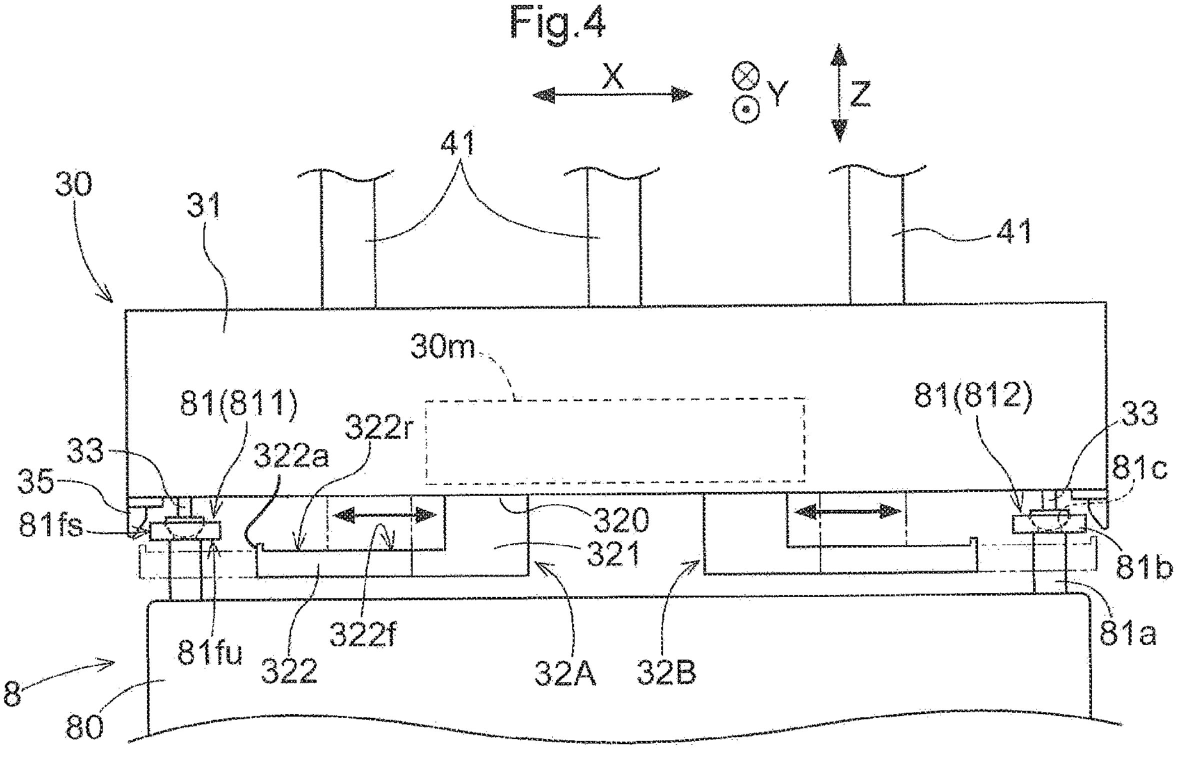
FIG. 4 is a diagram describing a holding operation.

As shown in FIG. 4, the holder 30 includes a holder body 31, holding parts 32 supported in a manner movable in the first direction X relative to the holder body 31, and a holding part driver 30*m* that drives the holding parts 32. For example, the holding part driver 30*m* includes an electric motor. The holder 30 will be described in detail later.

The articles 8 will now be described. As described above, the articles 8 are containers for accommodating objects.

As shown in FIG. 3, each article 8 includes an article body 80 and handles 81 protruding upward from the article body 80 and holdable by the holder 30. The article body 80 is a box for accommodating objects. The handles 81 are held by the holder 30 in the transport vehicle 1.

In the present embodiment, each article 8 includes a pair of handles 81. Each handle 81 includes multiple poles 81*a* extending from the upper surface of the article body 80 and a beam 81*b* connecting the upper ends of the multiple poles 81*a* and extending in the horizontal direction. In the present embodiment, the beams 81*b* are plates. The beams 81*b* may have another shape, rather than being plates.

Each handle 81 has a lower surface 81*fu* facing the article body 80 from above (also refer to FIG. 6) and a side surface 81*fs* continuous with the lower surface 81*fu* and facing toward one location in the first direction X. In the present embodiment, the lower surfaces 81*fu* are surfaces of the beams 81*b* facing downward. The side surfaces 81*fs* are surfaces of the beams 81*b* facing toward one location in the first direction X. For ease of explanation, the lower surfaces 81*fu* of the beams 81*b* may each be hereafter referred to as the lower surface 81*fu* of the handle 81. The side surfaces 81*fs* of the beams 81*b* may each be referred to as the side surface 81*fs* of the handle 81.

The multiple poles 81*a* included in each handle 81 are spaced from each other in the second direction Y. In the illustrated example, three poles 81*a* are at equal intervals. As described in detail later, the multiple poles 81*a* are at intervals between which the holding parts 32 in the holder 30 can pass.

The beams 81*b* are elongated in the second direction Y in which the multiple poles 81*a* are arranged. Each beam 81*b* has recesses 81*c* recessed downward from its upper surface. Each beam 81*b* has multiple (two in the illustrated example) recesses 81*c*. As described in detail later, each recess 81*c* receives a positioner 33 included in a holder 30 when the holder 30 holds the handles 81.

The pair of handles 81 hereafter are a first handle 811 and a second handle 812. The first handle 811 and the second handle 812 are spaced from each other in the first direction X. The first handle 811 and the second handle 812 are hereafter simply and collectively referred to as the handles 81 without being distinguished from each other.

The structure of the holder 30 will now be described in detail. The holder 30 can hold the pair of handles 81 described above.

As shown in FIG. 4, the holder 30 includes the holder body 31, the holding parts 32 supported in a manner movable in the first direction X relative to the holder body 31, and the holding part driver 30*m* that drives the holding parts 32. The holder body 31 is connected to the belts 41 described above.

In the present embodiment, the holder 30 includes multiple positioners 33.

In the present embodiment, the holder 30 includes at least a pair of holding parts 32. The pair of holding parts 32 are spaced from each other in the first direction X. The pair of holding parts 32 are driven by the holding part driver 30*m* to approach and separate from each other in the first direction X. In other words, the pair of holding parts 32 perform an approaching operation and a separating operation.

Figure 5:
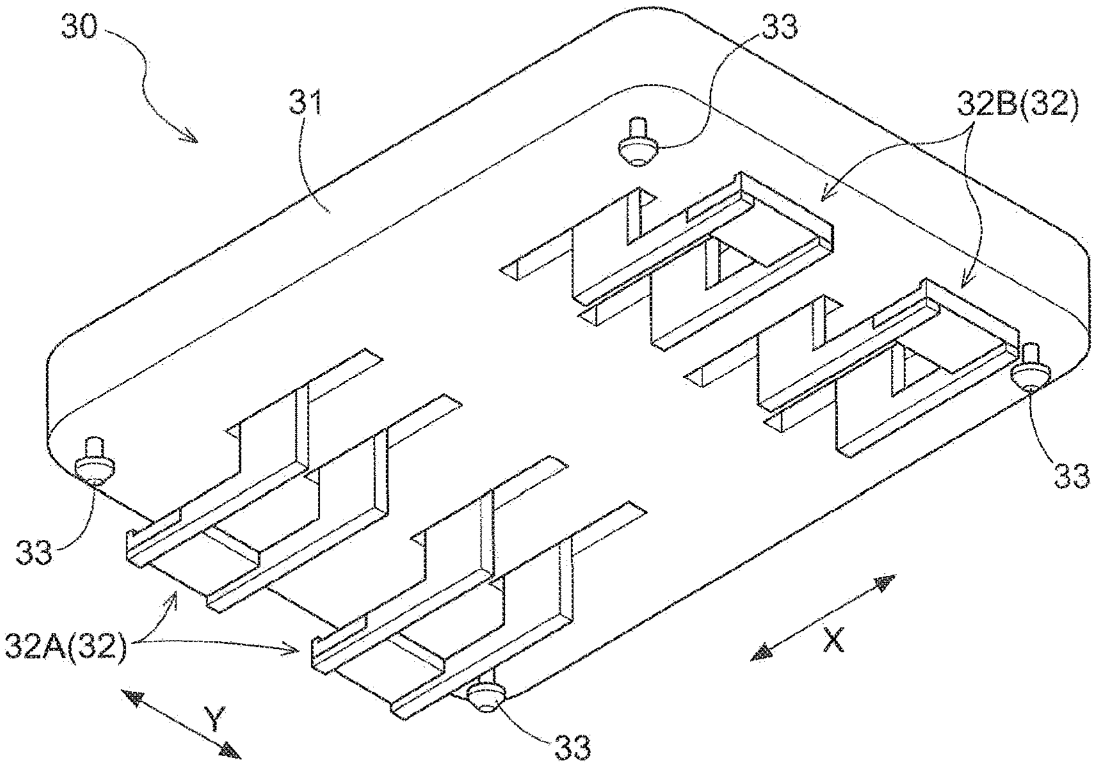
FIG. 5 is a perspective view of a holder when viewed from below.

The pair of holding parts 32 are a first holding part 32A and a second holding part 32B. As shown in FIG. 5, in the present embodiment, the holder 30 includes multiple first holding parts 32A. The multiple first holding parts 32A are arranged in the second direction Y. The multiple first holding parts 32A hold a single first handle 811 (refer to FIG. 4).

In the illustrated example, the holder 30 includes two first holding parts 32A together holding a single first handle 811. In the present embodiment, the holder 30 includes multiple second holding parts 32B. The multiple second holding parts 32B are arranged in the second direction Y. The multiple second holding parts 32B hold a single second handle 812 (refer to FIG. 4). In the illustrated example, the holder 30 includes two second holding parts 32B together holding a single second handle 812.

The first holding parts 32A and the second holding parts 32B are hereafter simply and collectively referred to as the holding parts 32 without being distinguished from each other.

As shown in FIG. 4, each holding part 32 includes supported portions 320 that are supported by the holder body 31, bases 321 extending downward from the supported portions 320, and extensions 322 extending from the bases 321 in the first direction X. In the present embodiment, each holding part 32, including the supported portions 320, the bases 321, and the extensions 322, has an overall L shape when viewed in the second direction Y.

Each holding part 32 has, on upper surfaces 322*f* of the extensions 322, a mount area 322*r* on which the lower surface 81*fu* of a handle 81 is placeable. Each holding part 32 holds the handle 81 with the upper surfaces 322*fu* of the extensions 322 receiving the lower surface 81*fu* of the handle 81 (also refer to FIG. 8).

In the present embodiment, the mount areas 322*r* in the first holding parts 32A (multiple first holding parts 32A in the present embodiment) receive the lower surface 81*fu* of the first handle 811. The first handle 811 is thus held by the first holding parts 32A. The mount areas 322*r* in the second holding parts 32B (multiple second holding parts 32B in the present embodiment) receive the lower surface 81*fu* of the second handle 812. The second handle 812 is thus held by the second holding parts 32B.

In the present embodiment, the first holding parts 32A and the second holding parts 32B placed between the first handle 811 and the second handle 812 in the first direction X are driven by the holding part driver 30*m* to perform the separating operation in which the first holding parts 32A and the second holding parts 32B separate from each other in the first direction X (hereafter simply referred to as the separating operation). In other words, the holder 30 places the first holding parts 32A and the second holding parts 32B between the first handle 811 and the second handle 812 in the first direction X and causes the first holding parts 32A and the second holding parts 32B to perform the separating operation. The holder 30 at least causes the first holding parts 32A and the second holding parts 32B to perform the separating operation to hold the article 8.

As indicated by an imaginary line in FIG. 4, the mount area 322*r* in each first holding part 32A faces the lower surface 81*fu* of the first handle 811 from below after the separating operation. The mount area 322*r* in each second holding part 32B faces the lower surface 81*fu* of the second handle 812 from below after the separating operation. In this state, the entire holder 30 is lifted by the lifter 40, thus placing the lower surface 81*fu* of the first handle 811 onto the mount areas 322*r* in the first holding parts 32A and placing the lower surface 81*fu* of the second handle 812 onto the mount areas 322*r* in the second holding parts 32B. In this manner, the holder 30 holds the article 8.

In the present embodiment, the multiple positioners 33 described above protrude downward from the holder body 31. The multiple positioners 33 are at positions corresponding to the recesses 81*c* on the handles 81 included in an article 8. With the holder 30 holding the handles 81, each of the multiple positioners 33 at least fits into the corresponding recess 81*c*. When the transport vehicle 1 receives an article 8 placed on a mount 91, each of the multiple positioners 33 fits into the corresponding recess 81*c* as the holder 30 is lowered toward the mount 91. In other words, each of the multiple positioners 33 fits into the corresponding recess 81*c* before the holder 30 holds the handles 81. This positions the holding parts 32 appropriately with respect to the handles 81. For a holder 30 rotatable about an axis parallel to the vertical direction Z, the multiple positioners 33 each fitting into the corresponding recess 81*c* place the holder 30 at an appropriate rotational position with respect to the article 8. The holding parts 32 are then operated to hold the handles 81 appropriately.

In the present embodiment, downward protrusions 35 protrude downward from the holder body 31. In FIG. 5, the downward protrusions 35 are not shown. The downward protrusions 35 are fixed to the holder body 31. The downward protrusions 35 are located to correspond to the handles 81 included in an article 8.

In the present embodiment, a pair of downward protrusions 35 are located to correspond to the pair of handles 81.

Figure 6:
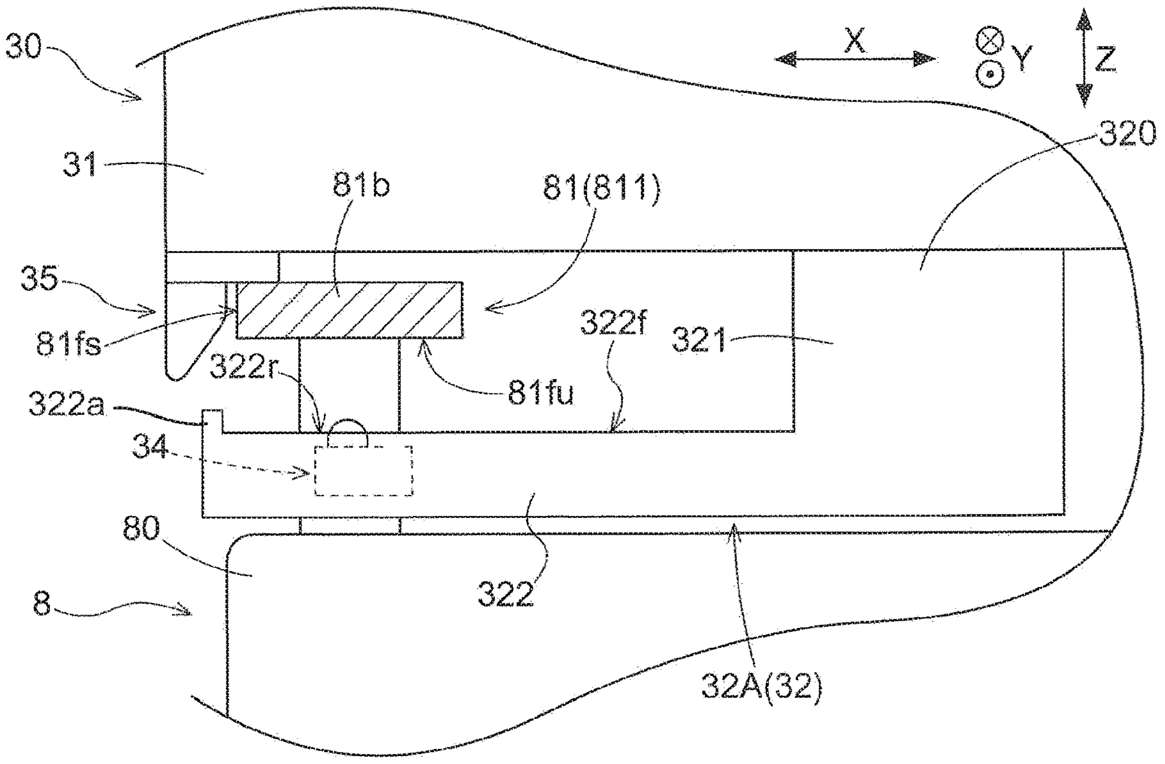
FIG. 6 is a diagram of the holder at a descending limit.

As shown in FIG. 6, when the holder 30 is at its descending limit, each downward protrusion 35 is in contact with the corresponding handle 81 included in an article 8. This reduces the likelihood of the holder 30 being lowered below the descending limit and also reduces the impact caused by the holder 30 hitting the handles 81 at the descending limit. In other words, the downward protrusions 35 reduce the likelihood of the holder 30 being lowered unintendedly and also reduces an impact. The descending limit is the lowest of positions to which the holder 30 can be lowered with respect to an article 8 in a transfer area 9. In the holder 30 at the descending limit, as shown in FIG. 6, the lower surface of each holding part 32 is above the upper surface of the article body 80. This structure stops the holder 30 being lowered unintendedly before the holding parts 32 come in contact with the article body 80.

Figure 7:
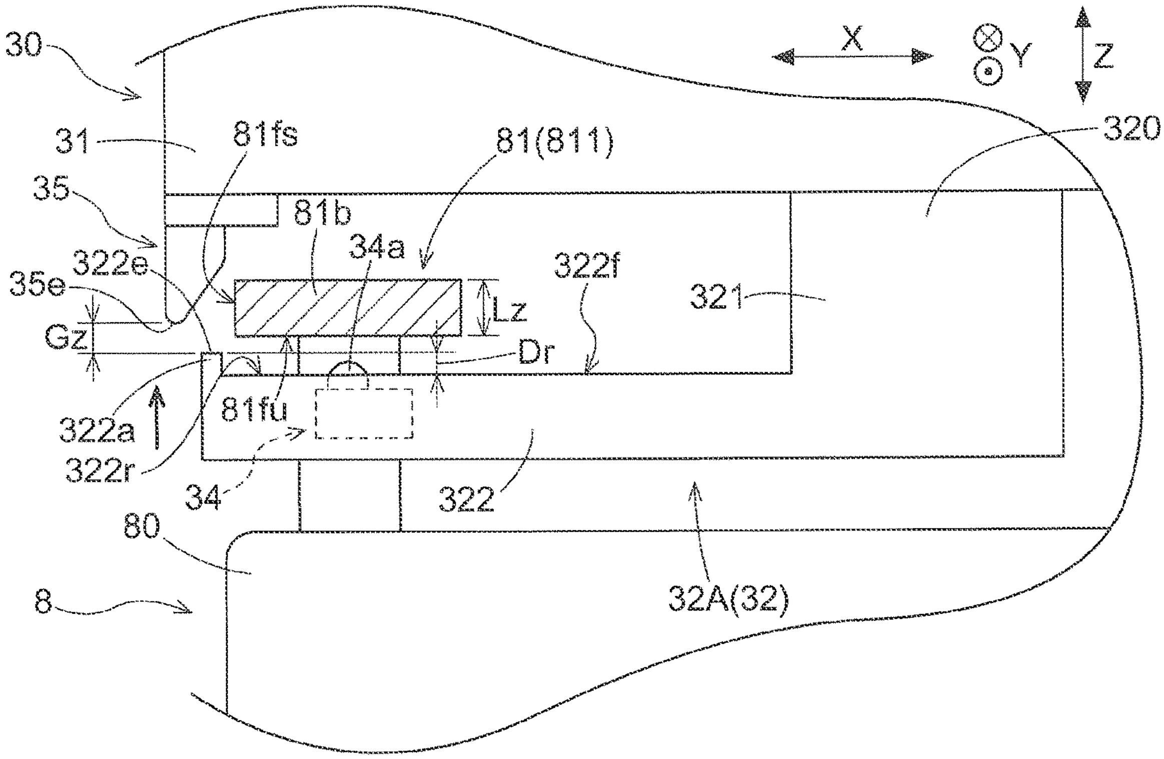
FIG. 7 is a diagram of a handle yet to be placed on a holding part.

As described above, the handles 81 in an article 8 being transferred are placed on the mount areas 322*r* in the extensions 322 in the holding parts 32. As shown in FIG. 7, the extensions 322 in each holding part 32 include a protrusion 322*a* located opposite to the bases 321 across the mount area 322*r* in the first direction X. The protrusion 322*a* protrudes upward from the mount area 322*r*. In the present embodiment, the protrusion 322*a* is at an end of the extension 322 in the first direction X. A holding operation for holding the handles 81 (the separating operation described above in the present embodiment) is performed with an upper end 322*e* of each protrusion 322*a* located below the lower surface 81*fu* of the corresponding handle 81.

Figure 8:
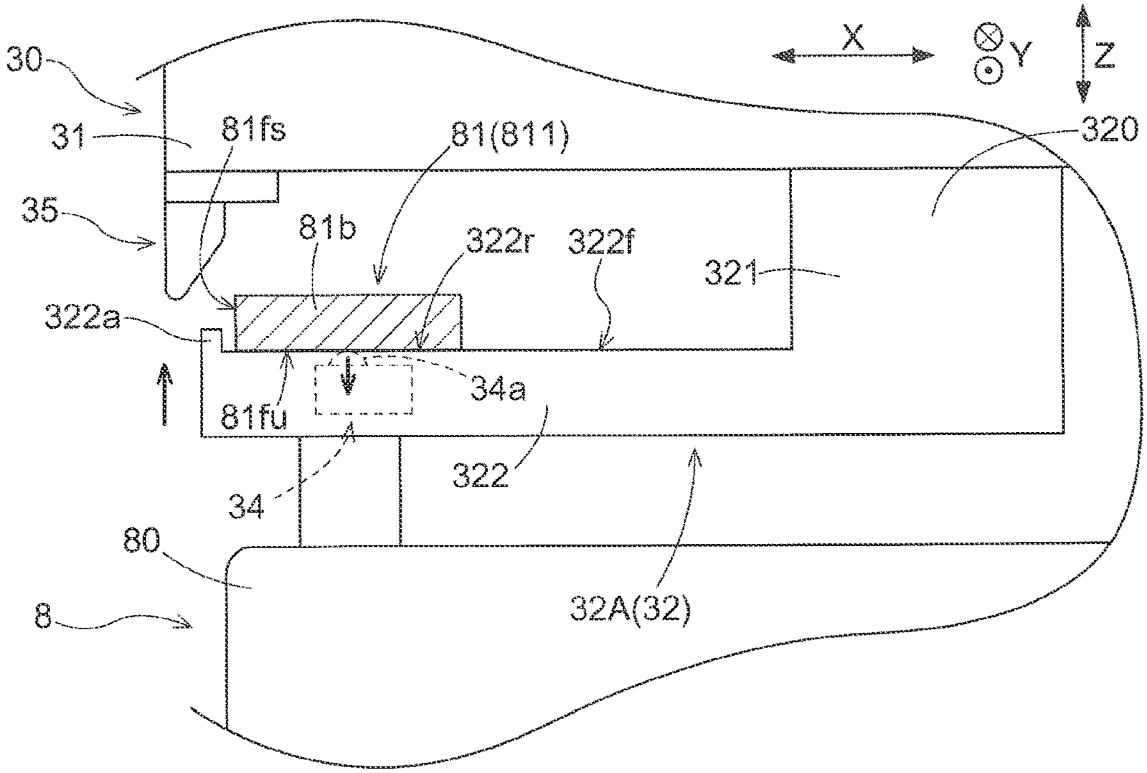
FIG. 8 is a diagram of the handle on the holding part.

As shown in FIG. 8, each protrusion 322*a* faces or is in contact with the side surface 81*fs* of the corresponding handle 81 in an article 8 in the first direction X, with the corresponding handle 81 in the article 8 placed on the mount area 322*r* in the extensions 322. The handle 81 is thus restricted by the protrusion 322*a* from moving outward in the first direction X. The handle 81 is also restricted by the bases 321 from moving inward in the first direction X. The transport vehicle 1 can thus appropriately reduce the likelihood that the article 8 held by the holder 30 slips off.

As shown in FIG. 7, the holder 30 includes sensors 34 that each detect the lower surface 81*fu* of a handle 81 being placed on the corresponding mount area 322*r*. In the present embodiment, each sensor 34 detects a handle 81 (specifically, a lower surface 81*fu*) in an area Dr (hereafter referred to as a detection area Dr) below the upper end 322*e* of the protrusion 322*a* and above the mount area 322*r*. In other words, the detection is not performed by the sensor 34 above the protrusion 322*a*. The sensor 34 thus does not detect the lower surface 81*fu* of a handle 81 above the protrusion 322*a*. In this structure, for example, when a handle 81 held by the holding parts 32 is on any of the protrusions 322*a* without being placed on the mount areas 322*r* appropriately, the corresponding one or more sensors 34 can avoid detecting the handle 81. Thus, the sensors 34 can avoid erroneously determining that the handle 81 is held appropriately when the handle 81 is held inappropriately by the holding parts 32. When a holder 30 performs the holding operation for holding the handles 81 without any of the sensors 34 detecting the lower surface 81*fu* of the corresponding handle 81, the holder 30 may retry the holding operation. In response to no handle detected with the sensor 34 after the retried holding operation, the transport vehicle 1 may notify, for example, the host controller or an operator of an error.

In the present embodiment, each sensor 34 detects the lower surface 81*fu* of a handle 81 being placed on the corresponding mount area 322*r*. More specifically, each sensor 34 includes a pressed portion 34*a* that is pressed by the lower surface 81*fu* of a handle 81 placed on the corresponding mount area 322*r*. In response to the pressed portion 34*a* being pressed, the sensor 34 detects the lower surface 81*fu* of the handle 81 being placed on the corresponding mount area 322*r* (refer to FIG. 8). In the present embodiment, each pressed portion 34*a* protrudes upward from the corresponding mount area 322*r* and has an upper end located below the upper end 322*e* of a protrusion 322*a*.

This structure allows each sensor 34 to detect the lower surface 81*fu* of a handle 81 in the detection area Dr below the upper end 322*e* of the protrusion 322*a* and above the mount area 322*r*.

As described above, in the present embodiment, the holder 30 includes the multiple (two in the present embodiment) first holding parts 32A and the multiple (two in the present embodiment) second holding parts 32B. In the present embodiment, the sensors 34 are located to correspond to the multiple first holding parts 32A and the multiple second holding parts 32B. More specifically, each of the multiple first holding parts 32A includes, in the mount area 322*r* of the first holding part 32A, a sensor 34 to detect the lower surface 81*fu* of the handle 81 being placed, and each of the multiple second holding parts 32B includes, in the mount area 322*r* of the second holding part 32B, a sensor 34 to detect the lower surface 81*fu* of the handle 81 being placed. This structure can determine whether the holding parts 32 are holding the corresponding handles 81 appropriately. For example, when some of the multiple holding parts 32 detect the handles 81, and the others do not detect the handles 81, the orientation of the article 8 being held or the direction in which the article 8 is inclined can be determined based on such detection results. For a holder 30 rotatable about the axis parallel to the vertical direction Z, a deviation of the rotational position of the holder 30 with respect to the article 8 can also be determined based on the results of detection performed by the multiple sensors 34.

As shown in FIG. 7, in the present embodiment, each downward protrusion 35 and the corresponding protrusion 322*a* on the holding parts 32 face each other in the vertical direction Z. More specifically, the downward protrusion 35 faces, in the vertical direction Z, the corresponding protrusion 322*a* on the holding parts 32 after the separating operation, or in other words, faces the corresponding protrusion 322*a* on the holding parts 32 being open outward in the first direction X. In other words, the downward protrusion 35 and the corresponding protrusion 322*a* overlap each other when viewed in the vertical direction Z after the separating operation of the holding parts 32.

A space Gz between a lower end 35*e* of each downward protrusion 35 and the upper end 322*e* of the corresponding protrusion 322*a* in the vertical direction Z is smaller than a thickness Lz of each handle 81 in the vertical direction Z. In the present embodiment, the thickness Lz of the handle 81 in the vertical direction Z refers to the thickness Lz of the portion of the handle 81 supported by the corresponding extensions 322 from below in the vertical direction Z (the beam 81*b* in the present embodiment). This structure reduces the likelihood that each handle 81 slips through the space Gz between the lower end 35*e* of the corresponding downward protrusion 35 and the upper end 322*e* of the corresponding protrusion 322*a* in the vertical direction Z when the handle 81 held by the holder 30 moves onto the protrusion 322*a* due to, for example, vibration.

The transport vehicle 1 described above causes the protrusions 322*a* on the holding parts 32 to face or to be in contact with the side surfaces 81*fs* of the corresponding handles 81 in the first direction X when the lower surfaces 81*fu* of the handles 81 are placed on the mount areas 322*r* in the corresponding holding parts 32. This structure reduces the likelihood that the handles 81 slip from the holder 30. The space Gz between the lower end 35*e* of each downward protrusion 35 and the upper end 322*e* of the corresponding protrusion 322*a* in the vertical direction Z is smaller than the thickness Lz of each handle 81 in the vertical direction Z. This structure further reduces the likelihood that each handle 81 slips from the holder 30 through the space Gz.

Other Embodiments

A transport vehicle according to other embodiments will now be described.

(1) In the above embodiment, the first holding parts 32A and the second holding parts 32B between the first handle 811 and the second handle 812 in the first direction X perform the separating operation in which the first holding parts 32A and the second holding parts 32B separate from each other in the first direction X to hold both the first handle 811 and the second handle 812 from inside in the first direction X. In some embodiments, the first holding parts 32A placed outward from the first handle 811 in the first direction X and the second holding parts 32B placed outward from the second handle 812 in the first direction X may perform the approaching operation in which the first holding parts 32A and the second holding parts 32B approach each other in the first direction X to hold both the first handle 811 and the second handle 812 from outside in the first direction X.

(2) In the above embodiment, each sensor 34 includes the pressed portion 34*a* that is pressed by the lower surface 81*fu* of a handle 81 placed on the corresponding mount area 322*r*, and detects the lower surface 81*fu* of a handle 81 being placed on the corresponding mount area 322*r* in response to the pressed portion 34*a* being pressed. In other words, the sensors 34 are contact sensors. In some embodiments, the sensors 34 may be contactless sensors that detect target objects contactlessly. In this case, the sensors 34 may be known sensors such as optical sensors or ultrasonic sensors.

(3) In the above embodiment, the sensors 34 are located to correspond to the multiple first holding parts 32A and the multiple second holding parts 32B. In some embodiments, the sensors 34 may be located in some of the multiple first holding parts 32A and in some of the multiple second holding parts 32B. In the above embodiment, the structure includes the two first holding parts 32A and the two second holding parts 32B. In this case, the sensors 34 may be located in, of the four holding parts 32 in total, a first holding part 32A and a second holding part 32B alone that are diagonal to each other when viewed in the vertical direction Z. This structure includes fewer sensors 34. In this structure, the handles 81 being placed on the holding parts 32 are detected at the positions diagonal to each other when viewed in the vertical direction Z, thus allowing easy determination as to whether the article 8 is entirely held appropriately.

(4) In the above embodiment, the structure includes the downward protrusions 35 protruding downward from the holder body 31. In some embodiments, the downward protrusions 35 may be eliminated. In the structure including the downward protrusions 35, the space Gz between the lower end 35*e* of each downward protrusion 35 and the upper end 322*e* of the corresponding protrusion 322*a* in the vertical direction Z may not be smaller than the thickness Lz of each handle 81 in the vertical direction Z. In this case, the downward protrusions 35 may reduce the likelihood of the holder 30 being lowered unintendedly and also reduce an impact, as in the above embodiment, although the downward protrusions 35 may not reduce the likelihood of the handles 81 slipping off.

(5) In the above embodiment, the holder 30 includes the positioners 33 (two positioners 33 in the illustrated example) that fit into the corresponding recesses 81*c* on the first handle 811 and the positioners 33 (two positioners 33 in the illustrated example) that fit into the corresponding recesses 81*c* on the second handle 812. In some embodiments, the holder 30 may include the positioners 33 that fit into the recesses 81*c* on one of the first handle 811 or the second handle 812 alone. In other words, the holder 30 may eliminate the positioners 33 corresponding to the recesses 81*c* on the other of the first handle 811 or the second handle 812.

(6) In the above embodiment, each article 8 includes the pair of handles 81. In some embodiments, each article 8 may include a single handle 81 or may include three or more handles 81. The number of holding parts 32 for holding the handles 81 is determined as appropriate for the number of handles 81.

(7) The structure described in each of the above embodiments may be combined with any other structures described in the other embodiments unless any contradiction arises. The embodiments described herein are merely illustrative in all respects and may be modified variously as appropriate without departing from the spirit and scope of the present disclosure.

Overview of Embodiments

Hereafter, the transport vehicle will be described.

A transport vehicle for traveling along a travel path to transport an article includes a compartment that accommodates the article, a holder that holds the article, and a lifter that lifts and lowers the holder between the compartment and a transfer area below the travel path. The article includes an article body and a handle protruding upward from the article body and holdable by the holder. The handle has a lower surface facing the article body from above and a side surface continuous with the lower surface and facing toward one location in a first direction being a predetermined horizontal direction. The holder includes a holder body, a holding part supported in a manner movable in the first direction relative to the holder body, and a holding part driver that drives the holding part. The holding part includes a supported portion supported by the holder body, a base extending downward from the supported portion, and an extension extending from the base in the first direction. The extension includes, on an upper surface of the extension, a mount area on which the lower surface of the handle is placeable. The extension includes a protrusion located opposite to the base across the mount area in the first direction. The protrusion protrudes upward from the mount area.

In this structure, the lower surface of the handle in the article is placed on the mount area in the extension in the holding part, thus holding the article. With the lower surface of the handle placed on the mount area in the extension in the holding part, the handle is restricted by the protrusion from moving toward one location in the first direction and is restricted by the base in the holding part from moving toward the opposite location in the first direction. This structure can thus appropriately reduce the likelihood that the article being held slips off.

The article may include a pair of the handles. The pair of handles may include a first handle and a second handle. The first handle and the second handle may be spaced from each other in the first direction. The holder may include a pair of the holding parts. The pair of holding parts may be driven by the holding part driver to approach and separate from each other in the first direction. The lower surface of the first handle may be placeable on the mount area in a first holding part of the pair of holding parts. The lower surface of the second handle may be placeable on the mount area in a second holding part of the pair of holding parts.

This structure allows the pair of holding parts to appropriately hold the article including the pair of handles. In addition, the protrusion on each of the first holding part and the second holding part is engaged with the side surface of the corresponding handle, thus restricting the first holding part and the second holding part from moving in the first direction (the direction in which the first holding part and the second holding part approach or separate from each other). This structure can eliminate or reduce, for example, a brake for restricting the first holding part and the second holding part from moving in the first direction. This structure includes the holder with fewer components, and is thus lighter and less expensive.

The first holding part and the second holding part placed between the first handle and the second handle in the first direction may be driven by the holding part driver to perform a separating operation in which the first holding part and the second holding part separate from each other in the first direction. The mount area in the first holding part may face the lower surface of the first handle from below after the separating operation. The mount area in the second holding part may face the lower surface of the second handle from below after the separating operation.

In this structure, the first holding part can hold the first handle from inside in the first direction, and the second holding part can hold the second handle from inside in the first direction. The holder is thus more easily smaller in the first direction than with the first handle and the second handle being held from outside in the first direction.

The holder may include a sensor that detects the lower surface of the handle being placed on the mount area.

This structure can detect, with the sensor, the lower surface of the handle being placed on the mount area. This structure can thus appropriately determine whether the holder is holding the article.

The sensor may detect the handle in an area below an upper end of the protrusion and above the mount area.

In this structure, for example, when the handle held by the holding part is on the protrusion without being placed on the mount area appropriately, the sensor can avoid detecting the handle. This structure can thus determine, with the sensor, whether the holding part is holding the handle appropriately.

A plurality of the first holding parts may be arranged in a second direction perpendicular to the first direction when viewed in a vertical direction. A plurality of the second holding parts may be arranged in the second direction. The plurality of first holding parts may hold the first handle. The plurality of second holding parts may hold the second handle.

In this structure, the article can be stably held by the plurality of first holding parts and the plurality of second holding prats.

Each of the plurality of first holding parts may include, in the mount area of the first holding part, a sensor that detects the lower surface of the handle being placed. Each of the plurality of second holding parts may include, in the mount area of the second holding part, a sensor that detects the lower surface of the handle being placed.

This structure can determine whether each holding part is holding the corresponding handle appropriately. For example, when some of the plurality of holding parts detect the handles, and the others do not detect the handles, the orientation of the article being held or the direction in which the article is inclined can be determined based on such detection results.

The transport vehicle may further include a downward protrusion protruding downward from the holder body. The downward protrusion and the protrusion in the extension may face each other in a vertical direction. A space between a lower end of the downward protrusion and an upper end of the protrusion in the extension in the vertical direction may be smaller than a thickness of the handle in the vertical direction.

This structure reduces the likelihood that the handle slips through the space between the lower end of the downward protrusion and the upper end of the protrusion in the vertical direction when the handle held by the holder moves onto the protrusion due to, for example, vibration.

INDUSTRIAL APPLICABILITY

The technique according to the embodiments of the present disclosure is applicable to a transport vehicle that travels along a travel path to transport an article and includes a compartment to accommodate the article, a holder to hold the article, and a lifter to lift and lower the holder between the compartment and a transfer area below the travel path.

What is claimed is:

1. A transport vehicle for traveling along a travel path to transport an article, the transport vehicle comprising:

a compartment configured to accommodate the article;

a holder configured to hold the article; and a lifter configured to lift and lower the holder between the compartment and a transfer area below the travel path, wherein:

the article comprises an article body and a pair of handles protruding upward from the article body and holdable by the holder, each of the handles has a lower surface facing the article body from above and a side surface continuous with the lower surface and facing toward one location in a first direction is a predetermined horizontal direction, the holder comprises a holder body, a holding part supported in a manner movable in the first direction relative to the holder body, and a holding part driver configured to drive the holding part, the holding part comprises a supported portion supported by the holder body, a base extending downward from the supported portion, and an extension extending from the base in the first direction, the extension comprises, on an upper surface of the extension, a mount area on which the lower surface of the handle is placeable, the extension comprises a protrusion located opposite to the base across the mount area in the first direction, and the protrusion protrudes upward from the mount area, the pair of handles comprise a first handle and a second handle, the first handle and the second handle are spaced from each other in the first direction, the holder comprises a pair of holding parts, the pair of holding parts comprise a first holding part and a second holding part, the first holding part and the second holding part placed between the first handle and the second handle in the first direction are driven by the holding part driver to perform a separating operation in which the first holding part and the second holding part separate from each other in the first direction, the mount area in the first holding part faces the lower surface of the first handle from below after the separating operation, and with the pair of holding parts spaced from each other, a pair of the protrusions have respective inner side surfaces separated from each other by a first distance in the first direction, whereas the pair of the handles have respective outer side surfaces separated from each other by a second distance in the first direction, the first distance being larger than the second distance.

2. The transport vehicle according to claim 1, wherein:

the pair of holding parts are driven by the holding part driver to approach and separate from each other in the first direction, the lower surface of the first handle is placeable on the mount area in the first holding part of the pair of holding parts, and the lower surface of the second handle is placeable on the mount area in the second holding part of the pair of holding parts.

3. The transport vehicle according to claim 1, wherein:

the holder comprises a sensor configured to detect the lower surface of each of the handles being placed on the mount area.

4. A transport vehicle for traveling along a travel path to transport an article, the transport vehicle comprising:

a compartment configured to accommodate the article;

a holder configured to hold the article; and a lifter configured to lift and lower the holder between the compartment and a transfer area below the travel path, wherein:

the article comprises an article body and a handle protruding upward from the article body and holdable by the holder, the handle has a lower surface facing the article body from above and a side surface continuous with the lower surface and facing toward one location in a first direction is a predetermined horizontal direction, the holder comprises a holder body, a holding part supported in a manner movable in the first direction relative to the holder body, and a holding part driver configured to drive the holding part, the holding part comprises a supported portion supported by the holder body, a base extending downward from the supported portion, and an extension extending from the base in the first direction, the extension comprises, on an upper surface of the extension, a mount area on which the lower surface of the handle is placeable, and the extension comprises a protrusion located opposite to the base across the mount area in the first direction, and the protrusion protrudes upward from the mount area, the holder comprises a sensor configured to detect the lower surface of the hand being placed on the mount area, and the sensor detects the handle in an area below an upper end of the protrusion and above the mount area.

5. The transport vehicle according to claim 2, wherein:

a plurality of the first holding parts are arranged in a second direction perpendicular to the first direction when viewed in a vertical direction, a plurality of the second holding parts are arranged in the second direction, the plurality of first holding parts hold the first handle, and the plurality of second holding parts hold the second handle.

6. The transport vehicle according to claim 5, wherein:

each of the plurality of first holding parts comprises, in the mount area of the first holding part, a sensor configured to detect the lower surface of each of the handles being placed, and each of the plurality of second holding parts comprises, in the mount area of the second holding part, a sensor configured to detect the lower surface of each of the handles being placed.

7. A transport vehicle for traveling along a travel path to transport an article, the transport vehicle comprising:

a compartment configured to accommodate the article;

a holder configured to hold the article; and a lifter configured to lift and lower the holder between the compartment and a transfer area below the travel path, wherein:

the article comprises an article body and a handle protruding upward from the article body and holdable by the holder, the handle has a lower surface facing the article body from above and a side surface continuous with the lower surface and facing toward one location in a first direction is a predetermined horizontal direction, the holder comprises a holder body, a holding part supported in a manner movable in the first direction relative to the holder body, and a holding part driver configured to drive the holding part, the holding part comprises a supported portion supported by the holder body, a base extending downward from the supported portion, and an extension extending from the base in the first direction, the extension comprises, on an upper surface of the extension, a mount area on which the lower surface of the handle is placeable, and the extension comprises a protrusion located opposite to the base across the mount area in the first direction, and the protrusion protrudes upward from the mount area, the transport vehicle further comprises a downward protrusion protruding downward from the holder body, wherein the downward protrusion and the protrusion in the extension face each other in a vertical direction, and wherein a space between a lower end of the downward protrusion and an upper end of the protrusion in the extension in the vertical direction is smaller than a thickness of the handle in the vertical direction.

* * * * *